United States Patent
Barth et al.

(10) Patent No.: US 9,038,238 B2
(45) Date of Patent: May 26, 2015

(54) MULTI-PIECE BUSHING, SUPPORT ASSEMBLY AND METHOD OF SUPPORTING A SHAFT

(71) Applicants: Scott Michael Barth, West Riverton, UT (US); David Afton Nelson, West Riverton, UT (US)

(72) Inventors: Scott Michael Barth, West Riverton, UT (US); David Afton Nelson, West Riverton, UT (US)

(73) Assignee: AKTIEBOLAGET SKF, Gothenburg (SE)

( * ) Notice: Subject to any disclaimer, the term of this patent is extended or adjusted under 35 U.S.C. 154(b) by 108 days.

(21) Appl. No.: 13/918,470

(22) Filed: Jun. 14, 2013

(65) Prior Publication Data

US 2014/0366318 A1    Dec. 18, 2014

(51) Int. Cl.
```
H01R 13/00    (2006.01)
F16C 33/14    (2006.01)
F16C 35/02    (2006.01)
F16C 43/02    (2006.01)
F16C 33/04    (2006.01)
F16C 17/02    (2006.01)
F16C 29/02    (2006.01)
```

(52) U.S. Cl.
CPC .............. F16C 33/14 (2013.01); *Y10T 16/088* (2015.01); *Y10T 16/05* (2015.01); *Y10T 29/49668* (2015.01); *F16C 2220/82* (2013.01); F16C 35/02 (2013.01); F16C 43/02 (2013.01); *F16C 17/02* (2013.01); *F16C 29/02* (2013.01); *F16C 33/046* (2013.01)

(58) Field of Classification Search
CPC ........ F16L 5/10; B60R 16/0222; H01R 13/00; Y10S 16/00; Y10S 16/41; Y10S 220/04
USPC .......................... 16/2.1, 2.5; 411/538, 542, 546
See application file for complete search history.

(56) References Cited

U.S. PATENT DOCUMENTS

| | | | | |
|---|---|---|---|---|
| 2,518,851 A | * | 8/1950 | Anderson | 16/2.1 |
| 3,016,562 A | * | 1/1962 | Reid | 16/2.1 |
| 3,100,929 A | * | 8/1963 | Nisper | 409/131 |
| 3,255,510 A | * | 6/1966 | Josephson et al. | 29/898.042 |
| 4,019,824 A | * | 4/1977 | Percy | 403/261 |
| 4,907,626 A | * | 3/1990 | Mori | 138/156 |
| 6,283,902 B1 | * | 9/2001 | Bakoledis | 492/30 |
| 6,485,241 B1 | * | 11/2002 | Oxford | 411/339 |
| 6,588,248 B1 | * | 7/2003 | Bickle et al. | 72/379.2 |
| 6,712,574 B1 | * | 3/2004 | Roopnarine | 411/433 |
| 6,808,181 B1 | * | 10/2004 | Shemtov | 277/606 |
| 7,677,850 B2 | * | 3/2010 | Sano | 411/45 |

\* cited by examiner

*Primary Examiner* — Roberta Delisle
(74) *Attorney, Agent, or Firm* — Mark Ussai; SKF USA Inc. Patent Dept.

(57) ABSTRACT

A bushing is for supporting a movable cylindrical body within a housing, the housing having a central axis, an inner circumferential surface and an annular groove formed in the surface. The bushing includes a plurality of generally arcuate tube segments disposable within the groove and alignable circumferentially about the housing axis so as to form a generally tubular body configured to slidably support the cylindrical body. Preferably, each tube segment is formed of a generally rigid metallic material.

26 Claims, 14 Drawing Sheets

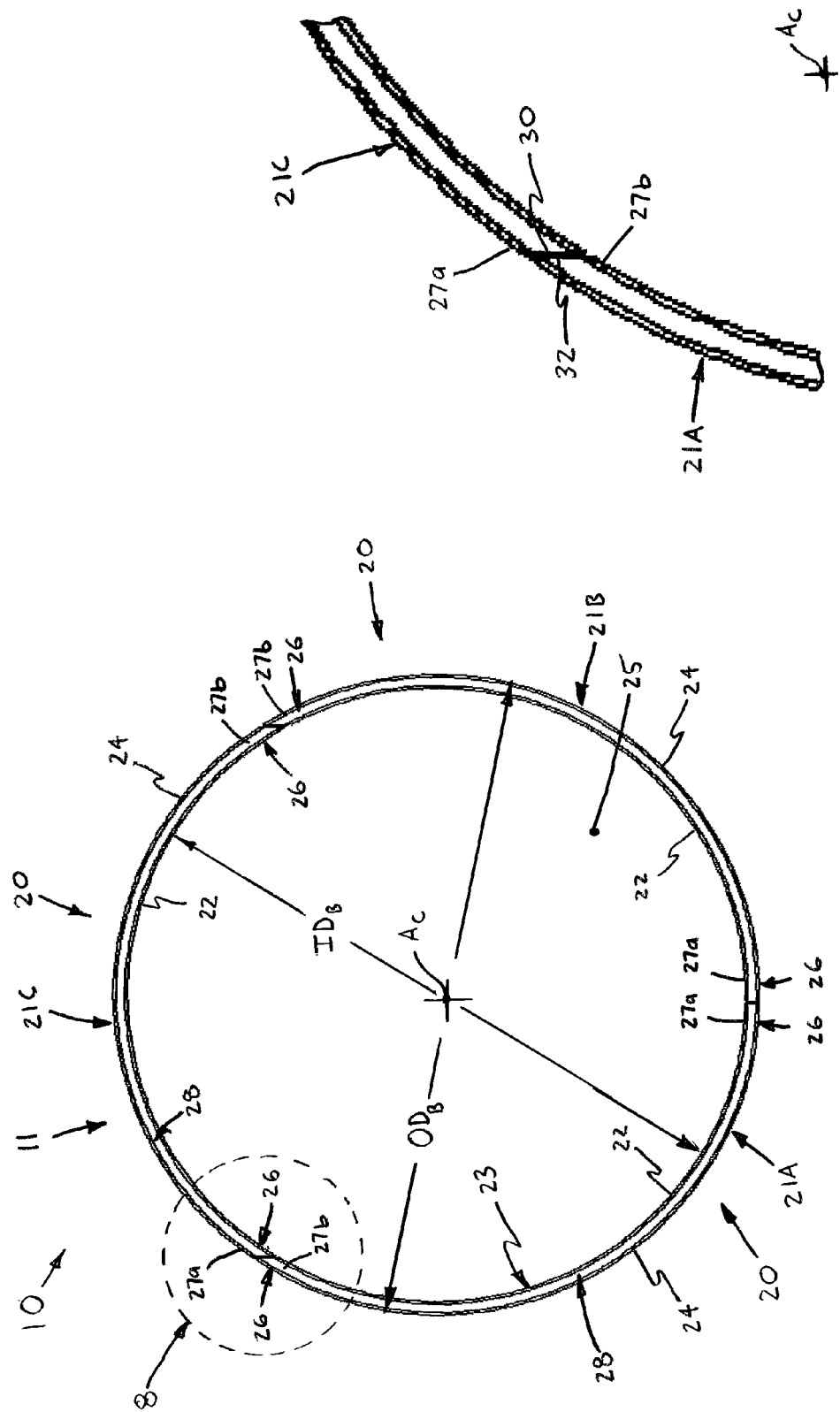

MULTI-PIECE BUSHING, SUPPORT ASSEMBLY AND METHOD OF SUPPORTING A SHAFT

BACKGROUND OF THE INVENTION

The present invention relates to bearings, and more particularly to bushings for high-pressure applications.

Plain bearings or bushings are well known and include a generally annular body with an inner circumferential surface for supporting a sliding and/or rotational movement of a cylindrical body, such as a shaft or piston, along a central axis. These bushings are typically installed within an annular groove or gland that retains the body with respect to the axis. In certain applications, the bushing can be installed within a gland by sliding the body axially into an open end of the gland, and then "closing" the gland with an adjacent structural member (e.g., retainer ring in a bearing block).

In other applications, the bushing must be installed within a "closed" gland that is spaced from the axial ends of a solid bore. In such cases, the bushing must be deflectable, at least to a certain extent, to enable the outside diameter of the body to inwardly deflect or contract for axial displacement of the body through the bore, and then expand outwardly when positioned within the gland. The bushings in such applications are typically formed of a polymeric material to enable such radial contraction and expansion. However, in high pressure applications, such polymeric bushings may lack the necessary material strength and thereby fail under loading.

SUMMARY OF THE INVENTION

In one aspect, the present invention is a bushing for supporting a movable cylindrical body within a housing, the housing having a central axis, an inner circumferential surface and an annular groove formed in the surface. The bushing comprises a plurality of generally arcuate tube segments disposable within the groove and alignable circumferentially about the housing axis so as to form a generally tubular body configured to slidably support the cylindrical body.

In another aspect, the present invention is a support assembly for supporting a movable cylindrical body, the assembly comprising a housing having a central axis, an inner surface extending circumferentially about the axis and defining a bore for receiving at least a portion of the shaft and an annular groove extending radially outwardly from the shaft and circumferentially about the axis. A plurality of generally arcuate tube segments are disposed within the housing groove and aligned circumferentially about the central axis so as to form a generally tubular body configured to slidably support the cylindrical body.

In a further aspect, the present invention is a shaft assembly comprising a movable shaft and a housing having a central axis, an inner surface extending circumferentially about the axis and defining a bore for receiving at least a portion of the shaft and an annular groove extending radially outwardly from the shaft and circumferentially about the axis. A plurality of generally arcuate tube segments are disposed within the housing groove and aligned circumferentially about the central axis so as to form a generally tubular bushing configured to slidably support the cylindrical body, each tube segment being formed of a generally rigid metallic material.

In yet another aspect, the present invention is a method of supporting a cylindrical body within a housing, the method comprising the steps of: forming an annular groove in an inner circumferential surface of the housing; providing a plurality of generally arcuate tube segments; and installing the tube segments within the annular groove such that the tube segments are aligned circumferentially about the central axis so as to form a generally tubular body configured to slidably support the cylindrical body.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIG. 7 is a side view of the multi-piece bushing of FIG. 1;

FIG. 8 is an enlarged view of section 8 of FIG. 7;

FIG. 9, are each a broken-away, perspective view of an alternative interface of a first and second tube segment of the multi-piece bushing;

DETAILED DESCRIPTION OF THE INVENTION

Figure 1:
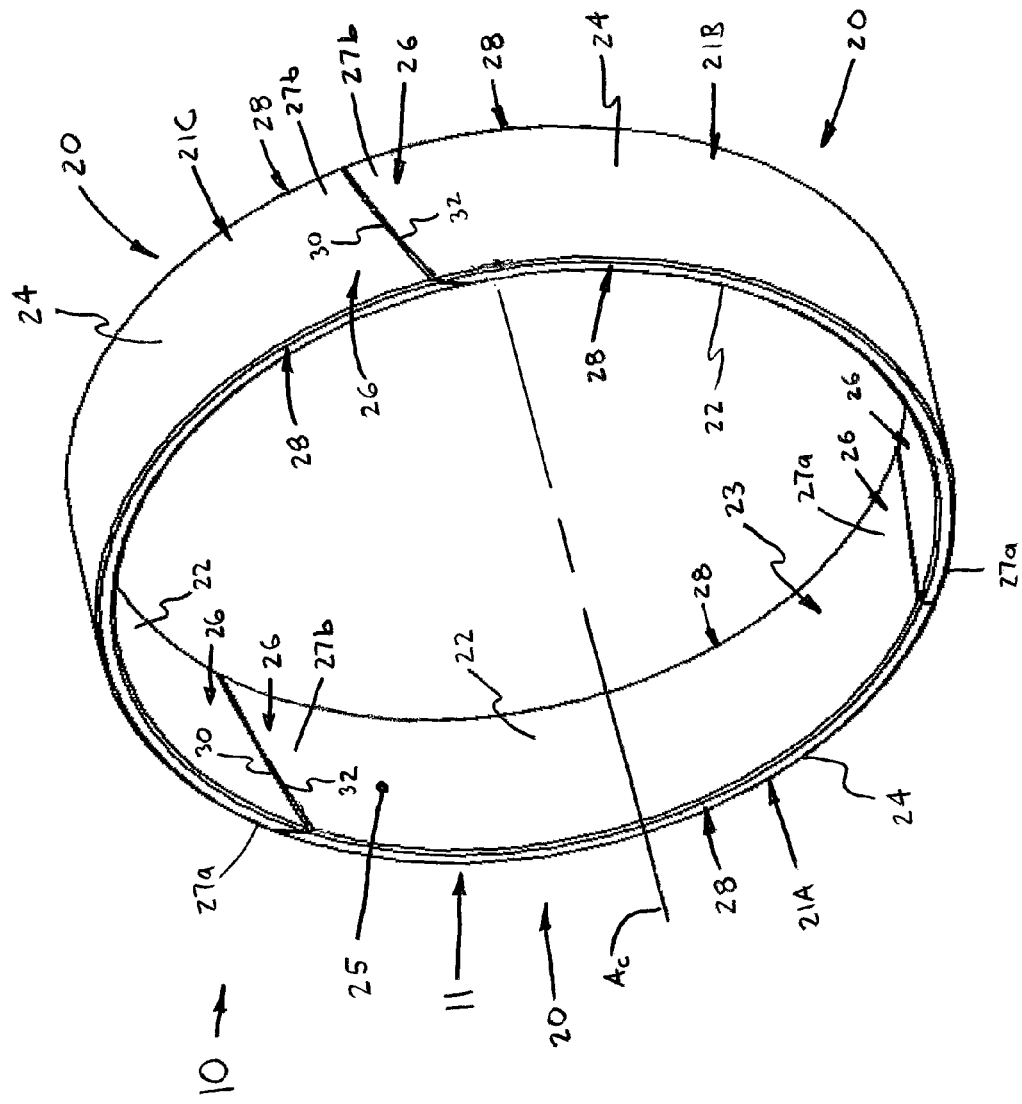
FIG. 1 is perspective view of a presently preferred construction of a multi-piece bushing, shown in an assembled state.

Certain terminology is used in the following description for convenience only and is not limiting. The words "upper" and "upward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. The terminology includes the words specifically mentioned above, derivatives thereof, and words of similar import.

Referring now to the drawings in detail, wherein like numbers are used to indicate like elements throughout, there is shown in FIGS. 1-19 a multi-piece bushing 10 for supporting a movable cylindrical body 12 (FIG. 19) within a housing 14 having an axis $A_C$. The body 12 is rotatable about and/or linearly displaceable along the axis $A_C$ and may be any type of movable body requiring support, such as a rotary shaft, a linearly displaceable piston, etc. The housing 14 has an inner surface 16 extending circumferentially about the axis $A_C$ and an annular groove 18 or "gland" formed in the surface 16 so as to extend radially outwardly from the surface 16 and circumferentially about the axis $A_C$. The bushing 10 basically comprises a plurality of generally arcuate tube segments 20 disposable within the groove 18 and alignable circumferentially about the housing axis $A_C$ so as to form a generally tubular body 11 configured to slidably support the cylindrical body 12.

Preferably, each tube segment 20 is formed of a generally rigid metallic material, such as for example, low carbon steel, so that the bushing 10 is capable of supporting relatively higher loads or pressures than a similarly sized bushing formed of a polymeric material. By forming the bushing 10 of a plurality of tube segments 20, the metallic bushing 10 is capable of being installed within existing "closed" glands, particularly those in which a solid metallic bushing is incapable of deflecting to the extent necessary for installation. Although depicted as relatively thin-walled tube segments 20, each segment 20, and the resultant bushing 10 formed thereby, may have any appropriate thickness as required by the specific application of the bushing 10.

Figure 5:
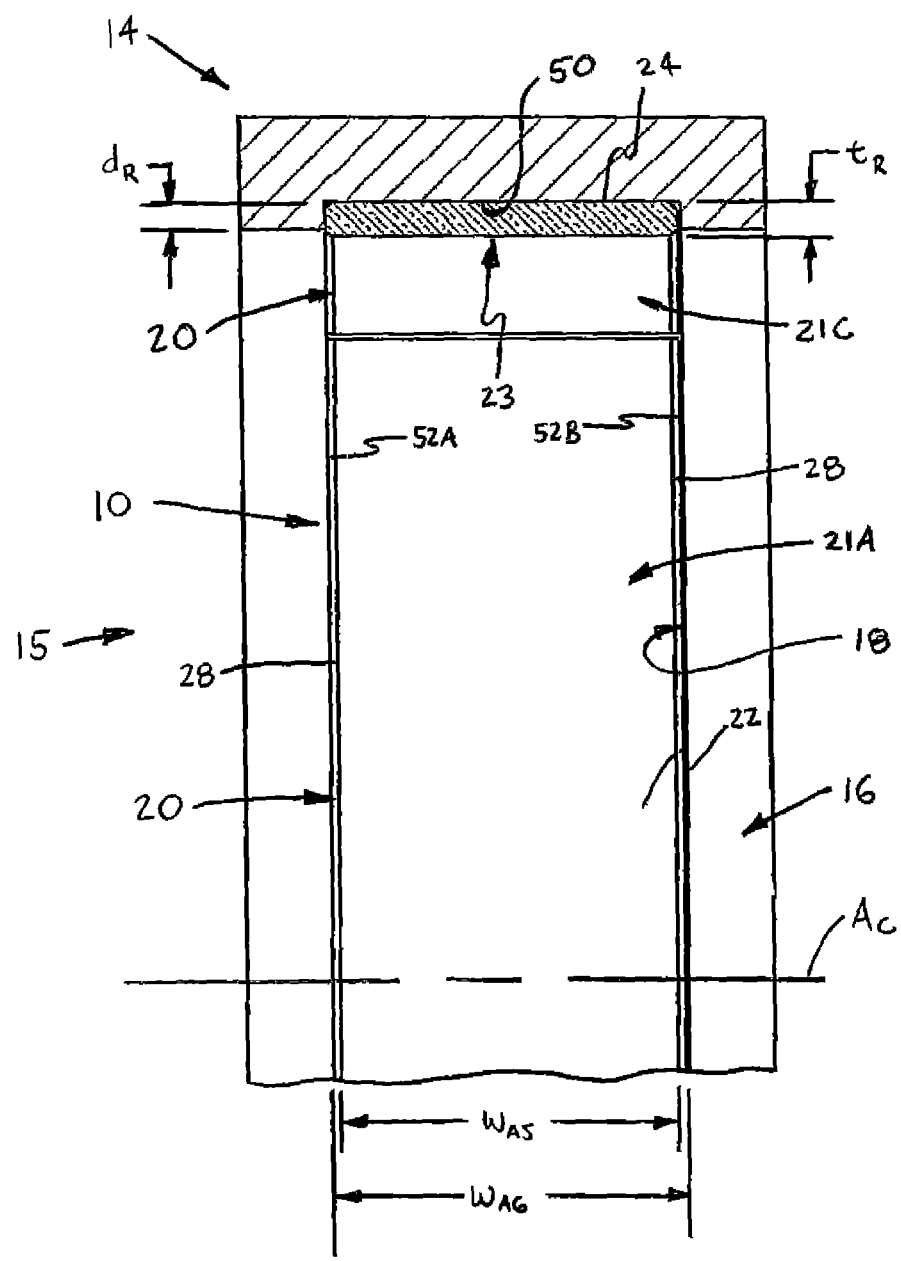
FIG. 5 is an enlarged, broken-way view of an axial cross-section of FIG. 3.

More specifically, each tube segment 20 has inner and outer circumferential surface sections 22, 24 respectively, two opposing radial ends 26 and two opposing axial ends or sides 28. Each one the tube segments 20 has an axial width $w_{AS}$ between the two axial ends/sides 28 and a radial thickness $t_R$ between the inner and outer surface sections 22, 24, as indicated in FIG. 5. The inner circumferential surface sections 22 of all of the plurality of tube segments 20 collectively form a generally continuous inner circumferential bearing surface 23 defining a bushing bore 25 when the segments 20 are disposed within the housing groove 18.

Figure 3:
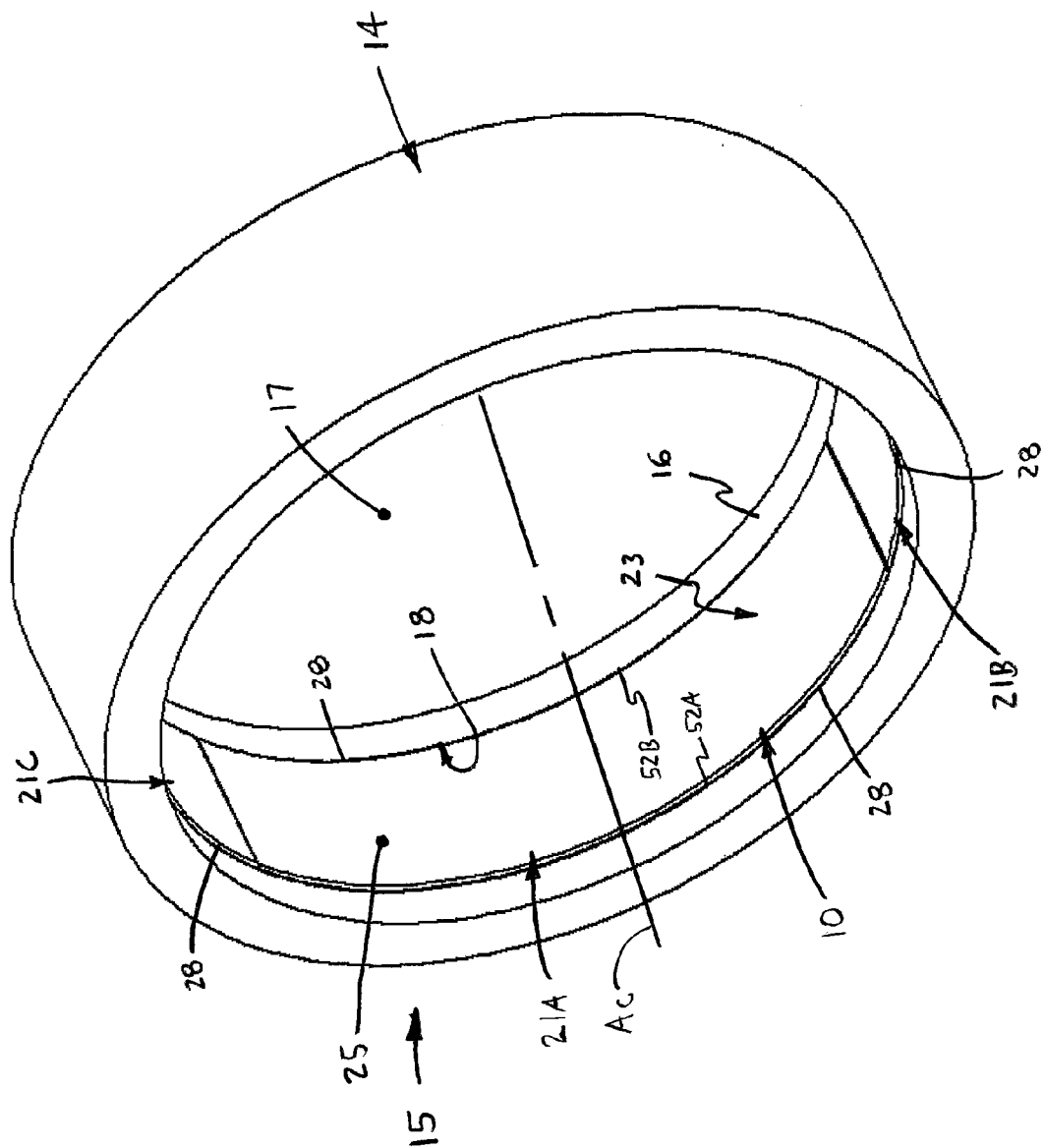
FIG. 3 is a perspective view of the multi-piece bushing shown installed in a housing.
Figure 18:
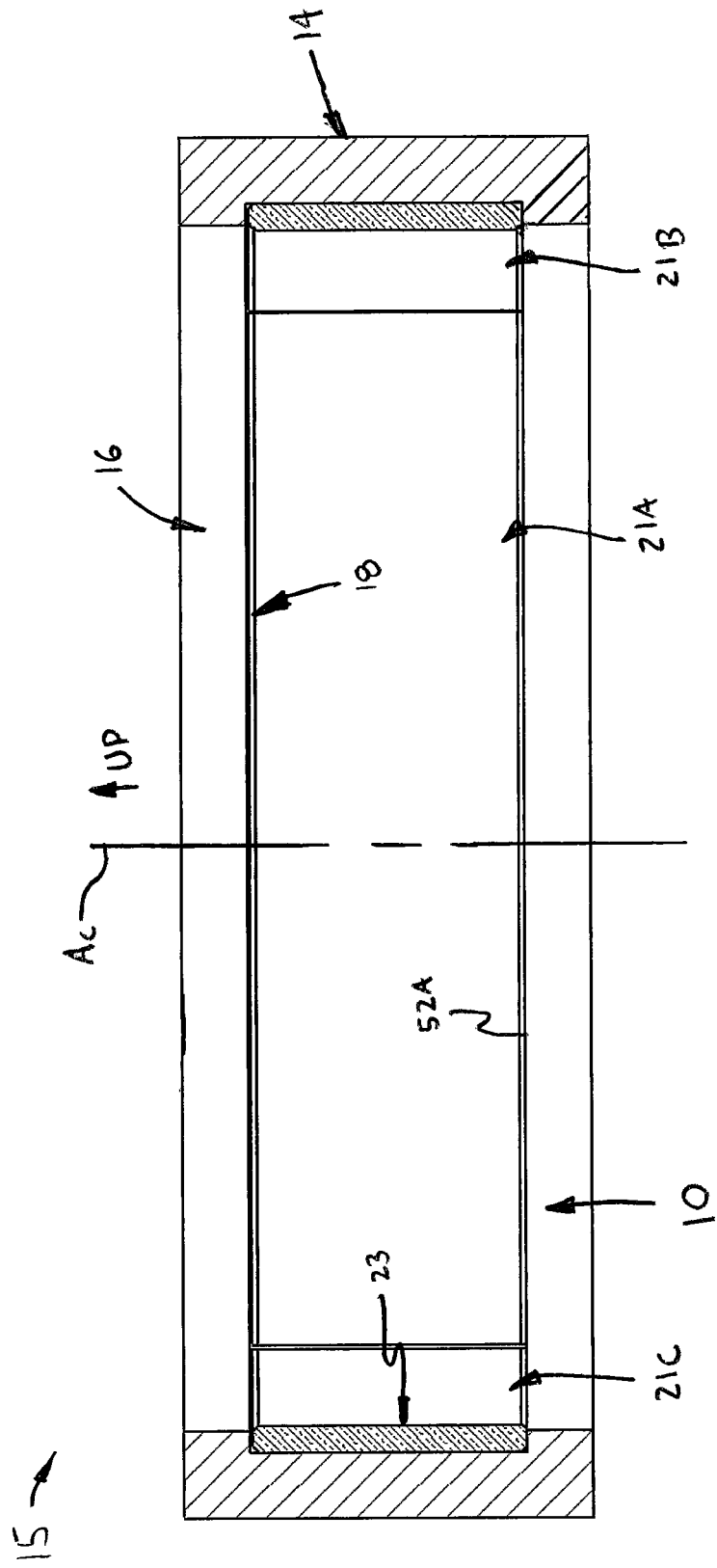
FIG. 18 is an axial cross-sectional view of the housing and bushing after installation.

The bearing surface 23 is configured to slidably support the cylindrical body 12, so as to reduce friction when the body 12 linearly displaces or/and angularly displaces about the central axis $A_C$. Additionally or alternatively, the tube segments 20 may be sized to provide a bushing inside diameter $ID_B$ (FIG. 7) with a magnitude relative to the magnitude of the cylindrical body outside diameter $OD_S$ (FIG. 19) such that bearing surface 23 seals against the body outer circumferential surface 12a. Further, when the bushing 10 is installed in the groove 18, each segment radial end 26 is located generally adjacent to one of the radial ends 26 of one of the other tube segments 20 and each segment axial end 28 is generally axially aligned with one of the two axial ends 28 of each one of the other tube segments 20, as best shown in FIGS. 3 and 18.

That is, the tube segments 20 are spaced about the central axis $A_C$ with the radial end 26 of each segment 20 generally abutting the end 26 of an adjacent segment 20 and the axial ends 28 on each side of all the segments 20 are generally aligned with each other to form one of two generally continuous axial side ends or edges. Although the radial ends 26 of the segments 20 are each located relatively closely proximal to the end 26 of the adjacent segment 20, there is preferably a radial clearance between at least some of the segment radial ends 26 to facilitate installation within the groove 18. In one preferred application, the total radial clearance between all the pairs of adjacent radial ends 26 of the tube segments 20 is about fifty-one thousands of an inch (0.051"), which results from three wire EDM cuts to a solid bushing in a preferred fabrication method, as discussed below. However, the actual radial clearance between any particular pair of segment radial ends 26 may be substantially lesser, such as when the radial ends 26 of two segments 20 are contacting each other.

Figure 2:
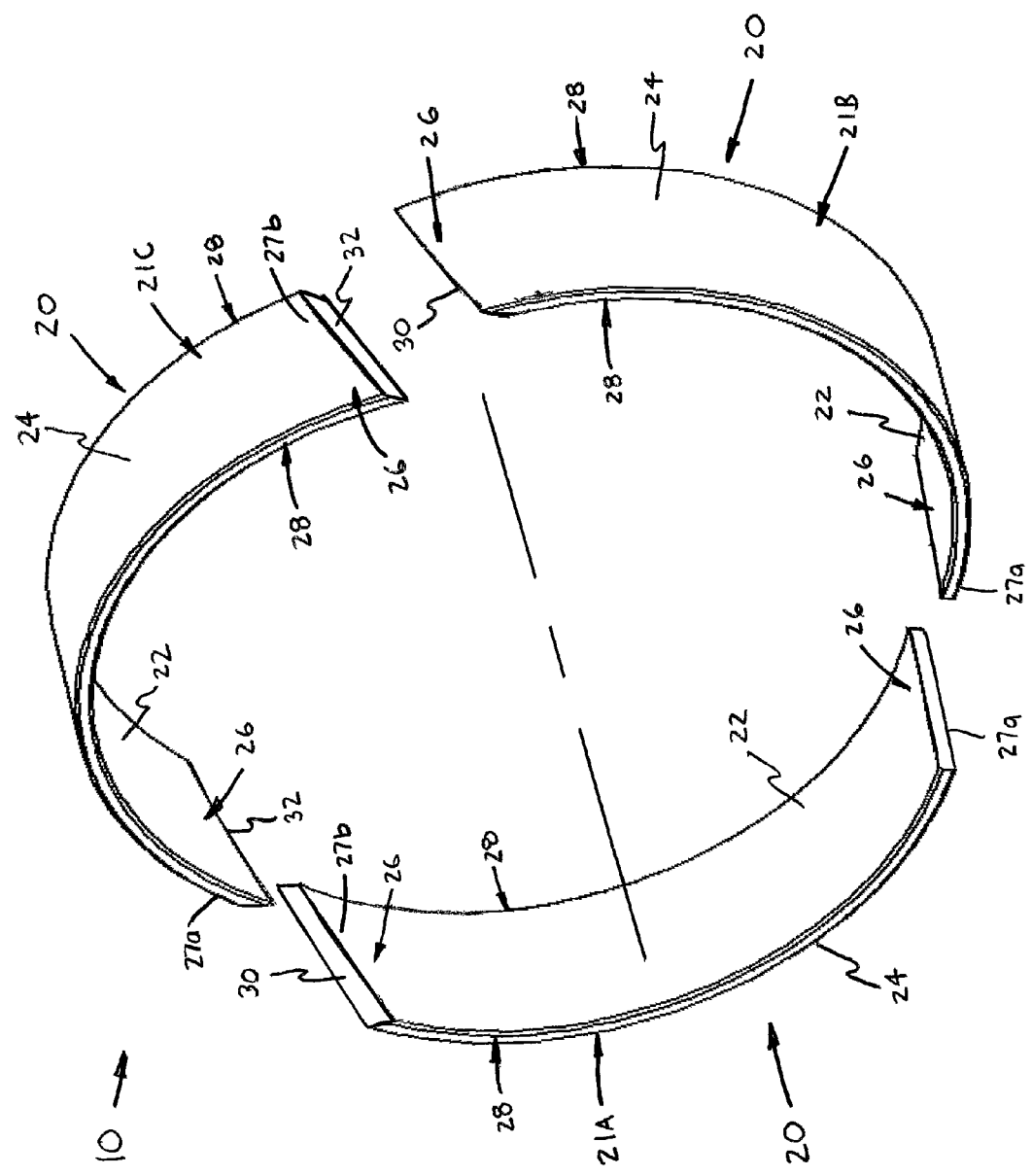
FIG. 2 is a perspective view of the multi-piece bushing of FIG. 1, shown in an exploded or "unassembled" view.

Preferably, the bushing 10 is formed of three pieces, such that the plurality of tube segments 20 includes a first segment 21A, a second segment 21B and a third segment 21C. However, the bushing 10 may include only two tube segments 20 or four or more segments 20 (no alternatives shown). As best shown in FIG. 2, each one of the first and second segments 21A, 21B preferably has a first radial end 27a adjacent to a first end 27a of the other one of the first and second segments 21A, 21B and an opposing, second radial end 27b with an angled end surface 30 facing generally "inwardly" or toward the central axis $A_C$. The third tubular segment 21C preferably has an angled end surface 32 on each one of first and second radial ends 27a, 27b, with each of the two angled end surfaces 32 of the third segment 21C facing generally "outwardly" or away from the central axis $A_C$.

As described in greater detail below, the first and second tube segments 21A, 21B are first installed within the housing groove 18 and then the third tubular segment 21C is installed in the groove 18 by positioning the segment 21C between the other two segments 21A, 21B and then displacing the third segment 21C generally radially outwardly. The two outwardly angled end surfaces 32 of the third segment 21C slide against the two inwardly-angled end surfaces 30 of the first and second segments 21A, 21B until each of the third segment end surfaces 32 are generally juxtaposed with a separate one of the angled end surfaces 30 of the first and second tube segments 21A, 21B.

Figure 6:
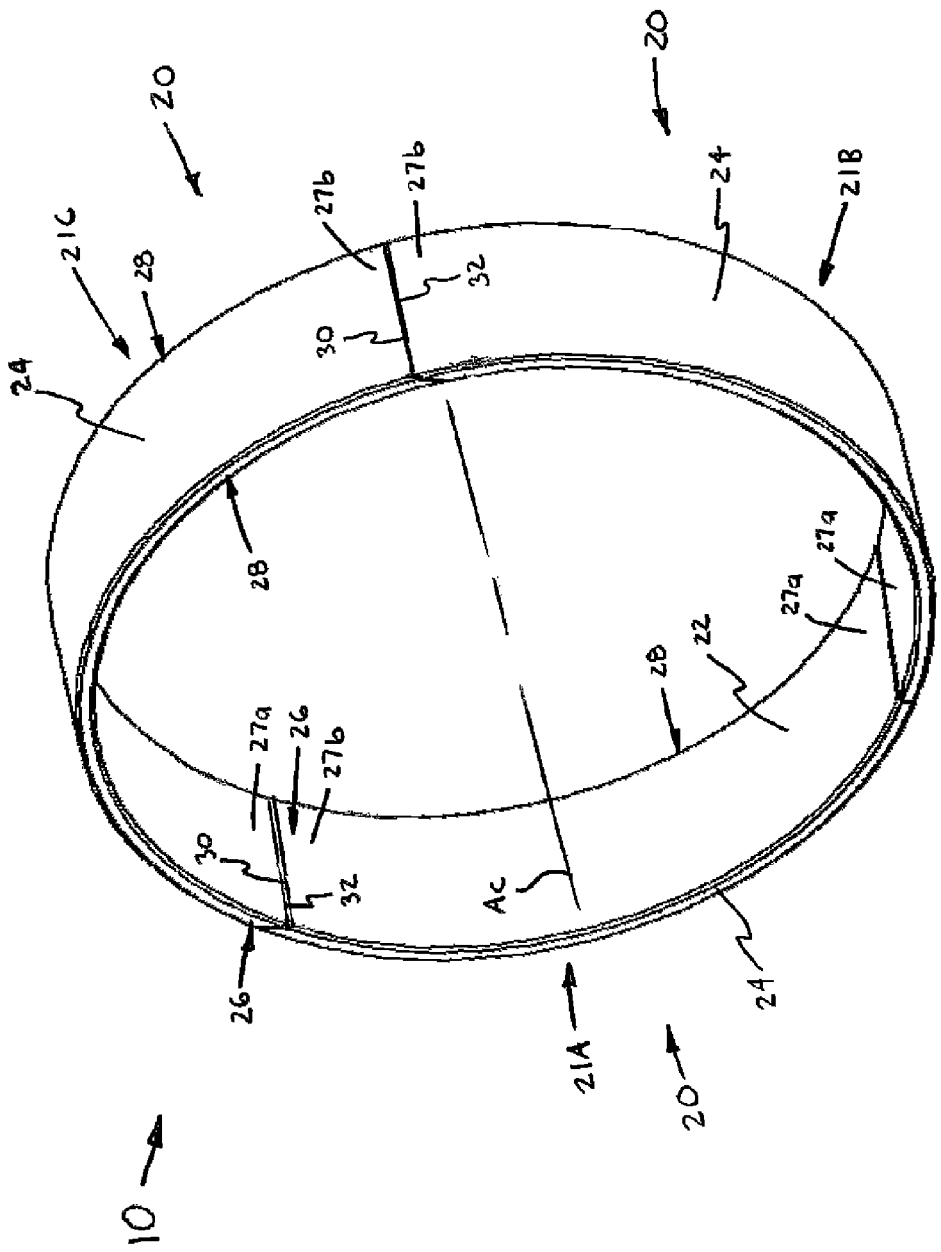
FIG. 6 is a perspective view of an alternative construction of a multi-piece bushing.

Preferably, the inwardly-facing angled radial end surface 30 of each one of the first and second tube segments 21A, 21B extends generally obliquely between the two axial ends 28 of the segment 21A, 21B, as best shown in FIGS. 1 and 2. That is, the two angled end surfaces 30 are both angled so as to face generally radially inwardly toward the axis $A_C$ and lay in a plane extending between the axial ends 28 that is skewed with respect to the central axis $A_C$, as opposed to being within a generally radial plane that includes or is parallel to the central axis $A_C$, as depicted in FIG. 6. Further, each one of the two outwardly-facing angled radial end surfaces 32 of the third tube segment 21C preferably extends generally obliquely between the two axial ends 28 of the third segment 21C. One of the two angled end surfaces 32 of the third tube segment 21C is oriented so as to generally mate with the angled radial end surface 30 of the first tube segment 21A and the other one of the two angled end surfaces 32 of the third tube segment 21C is oriented so as to generally mate with the angled radial end surface 30 of the second tube segment 21B. The obliquely-extending interfaces between the radial end surfaces 30, 32 of the three segments 21A, 21B and 21C reduces the potential for uneven wear on a linearly displacing cylindrical body 12 (e.g., a piston) as could be caused by a substantially axially-extending interface between the tube segments 20.

Figure 9A:
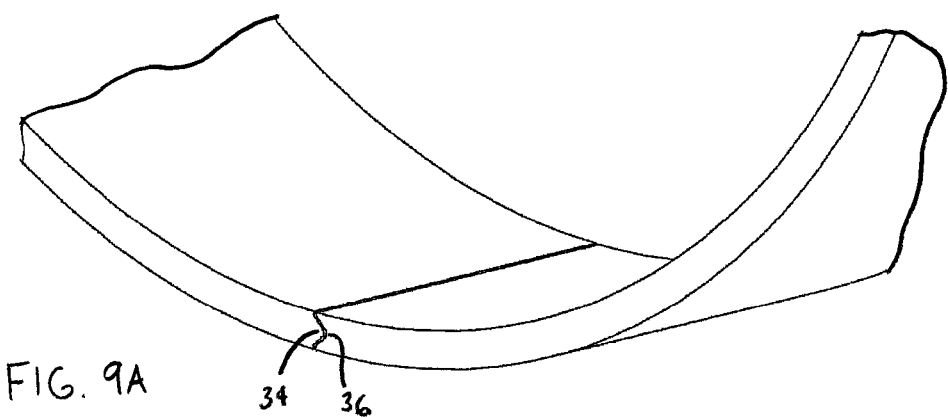
FIGS. 9A-9C, collectively
Figure 9B:
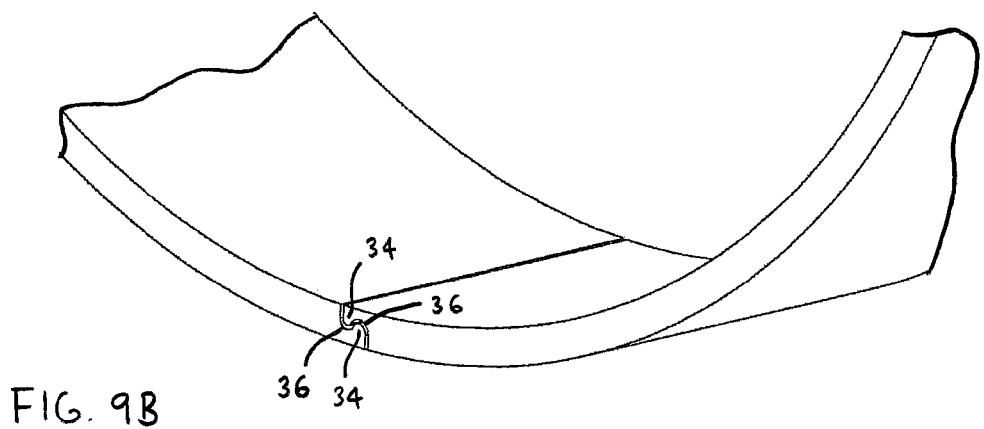
Figure 9C:
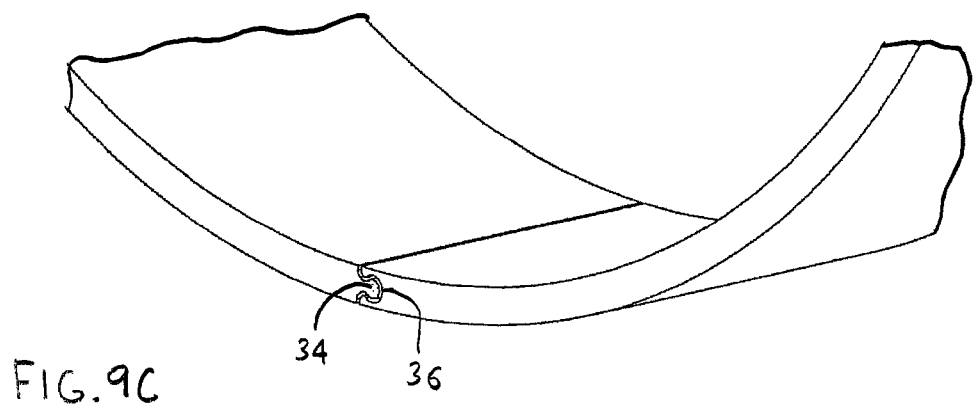

As depicted in FIG. 9, the first radial end 27a of at least one of the first and second tube segments 21A, 21B preferably has a projection 34 and the first radial end 27a of at least the other one of the tube segments 21B, 21A has a recess 36. The recess(es) 36 is/are configured to receive the projection(s) 34 so as to interlock the first and second tube segments 21A, 21B, which is particularly beneficial when installing the bushing 10 in the manner as described below. The projection 34 may extend from only one of the first radial ends 27a and be formed with generally wedge-shaped radial cross-sections (FIG. 9A), generally ball-shaped radial cross-sections (FIG. 9C) or in any other appropriate manner, with a mating recess 36 formed in a complementary fashion in the other first radial end 27a. Alternatively, the first radial ends 27a of both the first and second tube segments 21A, 21B may be formed with both a projection 34 and a recess 36, such as for example, an interlocking "S"-shaped interface as depicted in FIG. 7B. As a further alternative, the two mating ends 27a, 27b of the first and second tube segments 21A, 21B may be formed to generally abut without interlocking.

Figure 11:
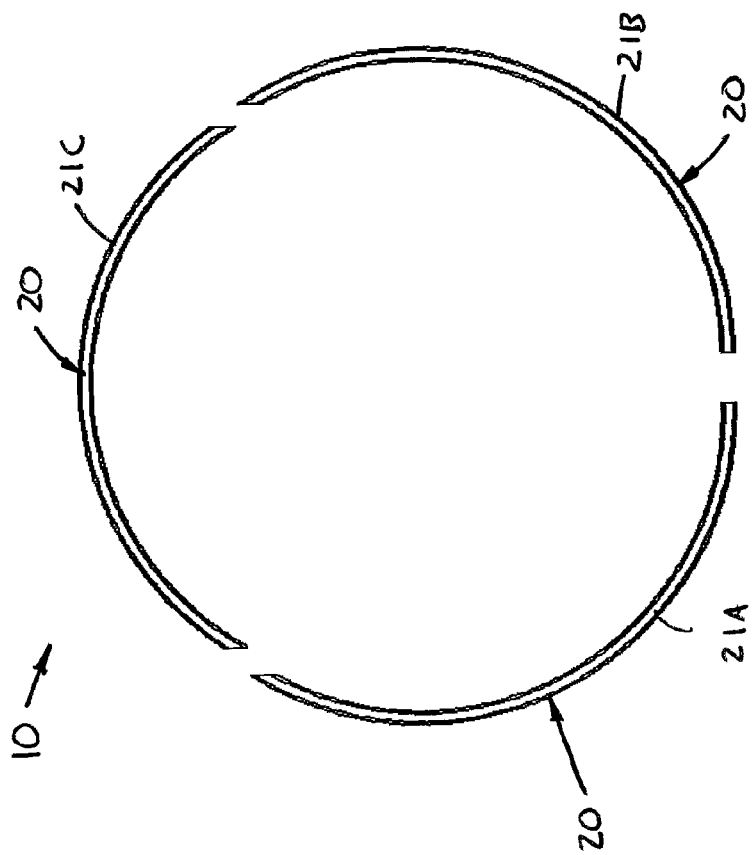
FIG. 11 is a side view of the bushing of FIG. 10 after the cutting process.
Figure 10:
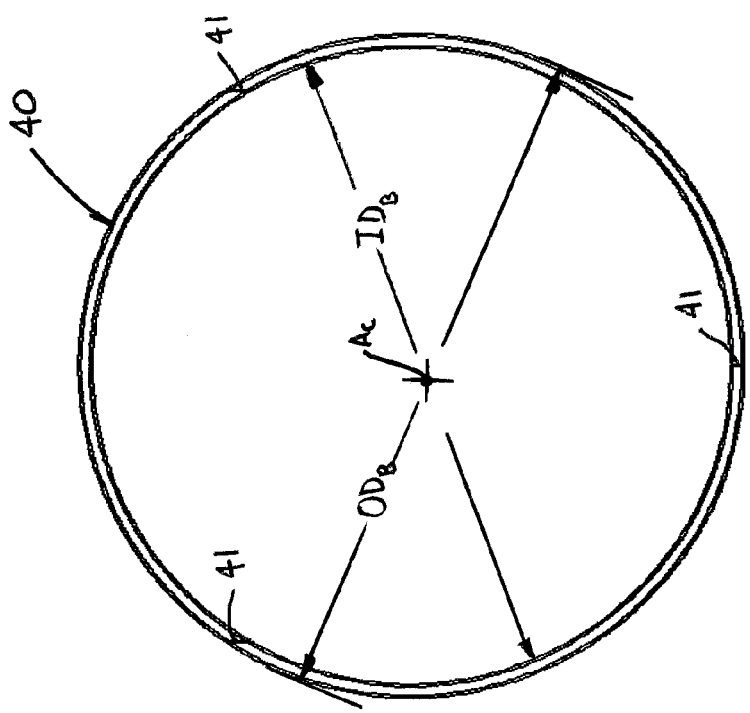
FIG. 10 is a side view of a solid bushing used to fabricate the multi-piece bushing, shown marked for cutting.

Referring to FIGS. 10 and 11, the bushing 10 is preferably formed by first fabricating a solid bushing 40 having an outside diameter $OD_B$ approximately equal to the inside diameter $ID_G$ of the housing groove 18 (described in further detail below), shown in FIG. 10 with markings 41 to indicate separation zones/planes. Then, the solid bushing 40 is separated into the plurality of tube segments 20 by any appropriate means, such for example, cutting by wire EDM ("electrical discharge machining"), a saw, a torch, a water jet or a laser device, so as to form the tube segments 20, as indicated in FIG. 11. The separating or cutting process is conducted so as to form the first and second ends 27a, 27b of each tube segment 20 with the radial end surfaces 30, 32, projection(s) 34 and recess(es) 36 as described above.

Figure 4:
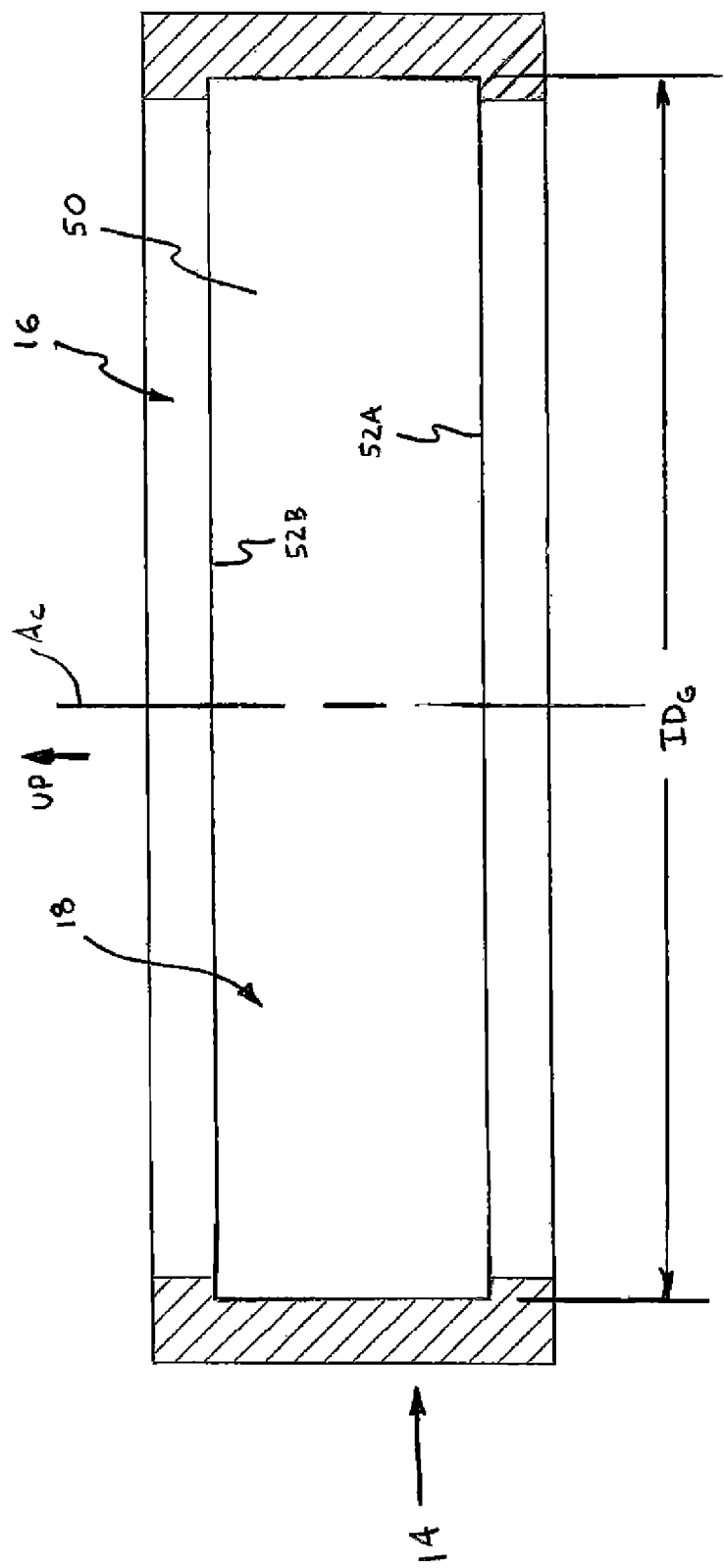
FIG. 4 is an axial cross-sectional view of a presently preferred housing.
Figure 19:
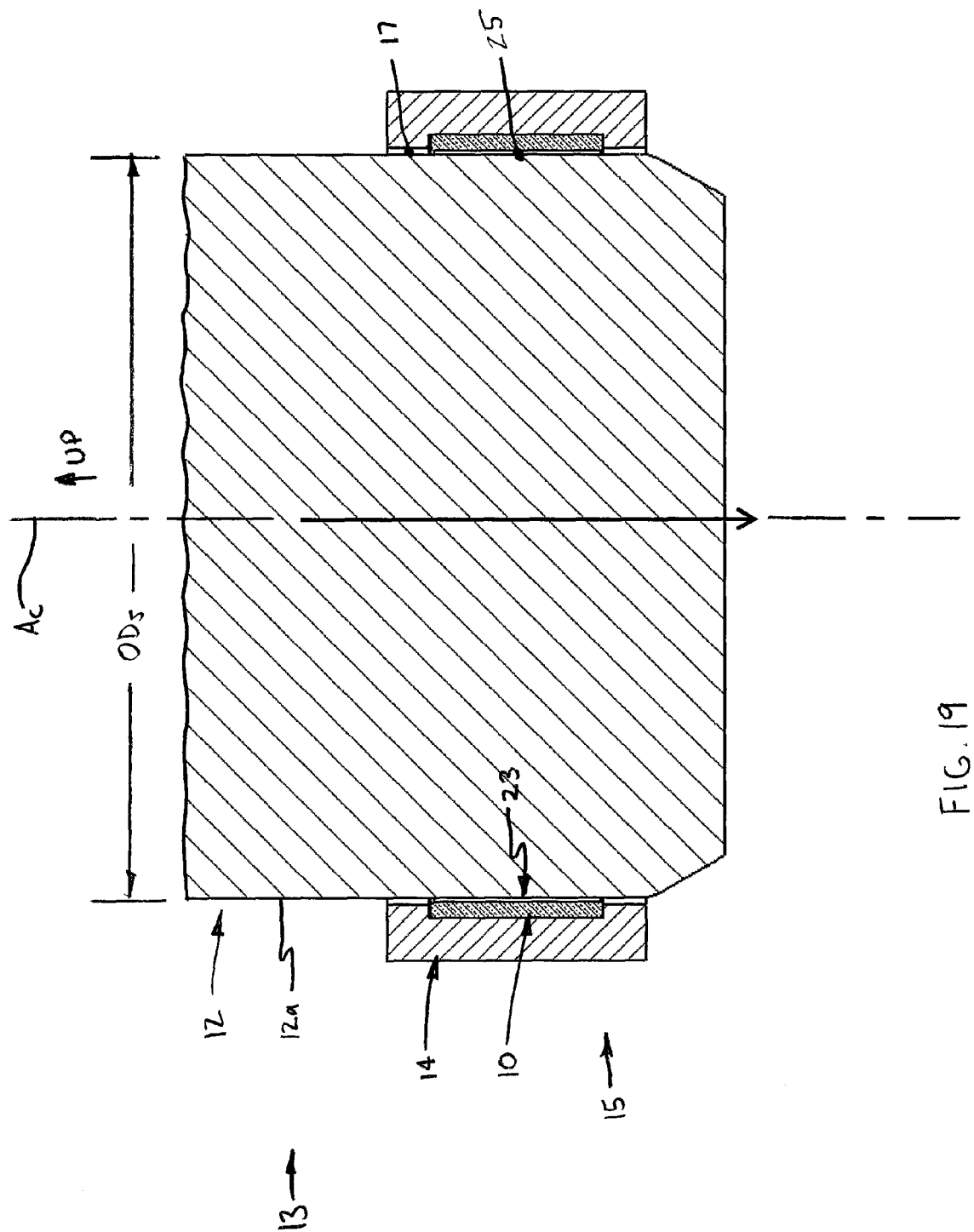
FIG. 19 is an axial cross-sectional view of the housing and installed bushing, showing the insertion of a movable cylindrical body supported by the bushing.

Referring to FIGS. 3, 4, 5 and 18, the bushing 10 in combination with the housing 14 forms a support assembly 15 for a movable cylindrical body 12 (FIG. 19). Although depicted as a generally circular cylinder with an axial length that is not substantially greater than axial length/width of the bushing 10, the housing 14 may be any appropriate body or assembly for at least partially containing the cylindrical body 12, such as for example, a pump body, a cylinder of a piston device, a pillow block for a bearing, etc, and may have any appropriate size or shape. As discussed above, the housing 14 has an inner surface 16 extending circumferentially about the axis $A_C$, which defines a bore 17 for receiving at least a portion of the cylindrical body or shaft 12. The annular groove or gland 18 extends radially outwardly from the housing inner surface 16 and circumferentially about the axis $A_C$. As best shown in FIG. 4, the groove 18 includes an inner circumferential surface 50, which is spaced radially outwardly from the housing inner surface 16 and has an inside diameter $ID_G$, and two facing shoulder surfaces 52A, 52B. The shoulder surfaces 52A, 52B are spaced axially apart and extend generally radially between the groove inner surface 50 and the housing inner surface 16.

As such, the housing groove/gland 18 has an axial width $w_{AG}$ defined as the axial or perpendicular distance between the shoulder surfaces 52A, 52A and a radial depth $d_R$ defined as the radial distance between the housing inner surface 16 and the groove inner surface 50. In one presently preferred application, the housing 14 is oriented with the central axis $A_C$ extends generally vertically, such that the two shoulder surfaces 52A, 52B extend generally horizontally, one shoulder surface 52A facing generally upwardly and providing a support surface, as discussed below.

Further, the housing groove 18 is sized to receive the bushing tube segments 20 with a slight axial clearance and with each of the segments 20 projecting radially inwardly with respect to the housing inner surface 16 and into the bore 17. That is, the axial width $w_{AS}$ of each tube segment 20 is lesser than the groove axial width $w_{AG}$, such that all of the tube segments 20 fit within the groove 18 with clearance, as best shown in FIG. 5. Also, the radial thickness $t_R$ of each tube segment 20 is greater than the groove radial depth $d_R$ such that the bearing surface 23 is spaced radially inwardly from the housing surface 16. Thus, the cylindrical body or shaft 12 only contacts the bearing surface 23 and not the housing inner surface 16. Furthermore, the inside diameter $ID_G$ of the housing groove 18 is sized slightly larger than the outside diameter $OD_B$ of the assembled bushing body 11 to receive all the bushing segments 20 with minimal radial clearance.

Figure 13:
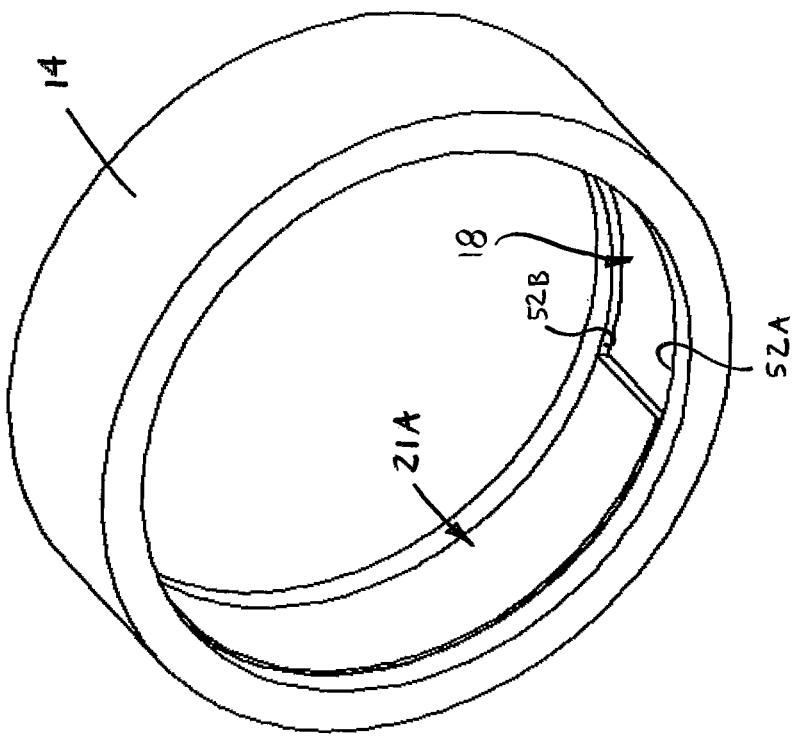
FIG. 13 is a perspective view of the housing with the first segment installed.
Figure 12:
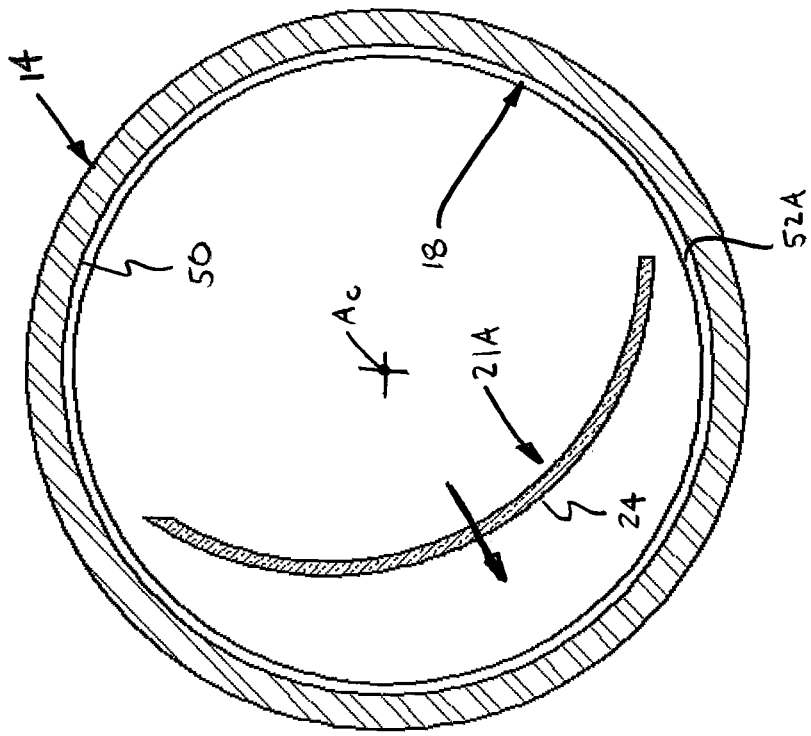
FIG. 12 is an axial cross-sectional view of a housing and a first tube segment of the bushing, viewed in a downward direction and depicting a first step in an installation process.
Figure 15:
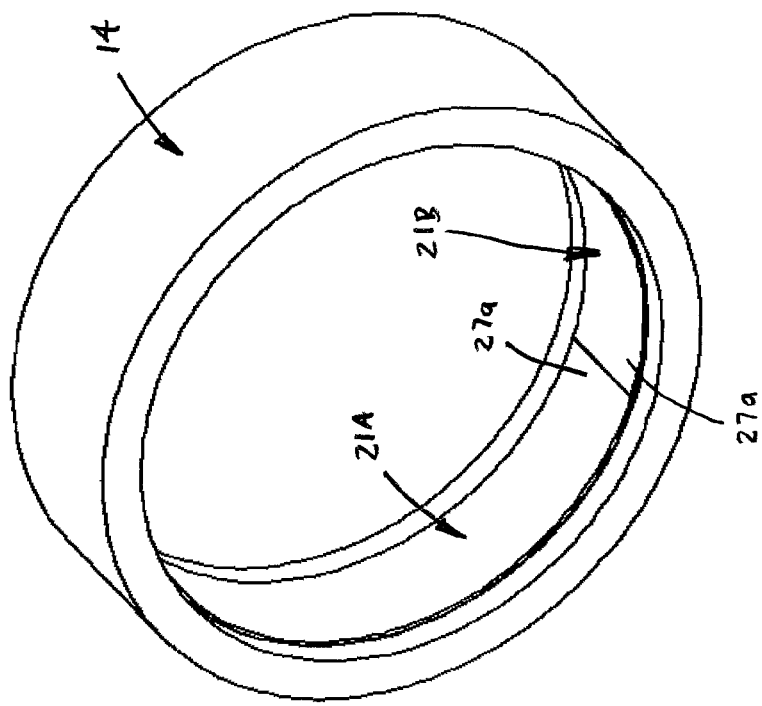
FIG. 15 is a perspective view of the housing with the first and second segments installed.
Figure 14:
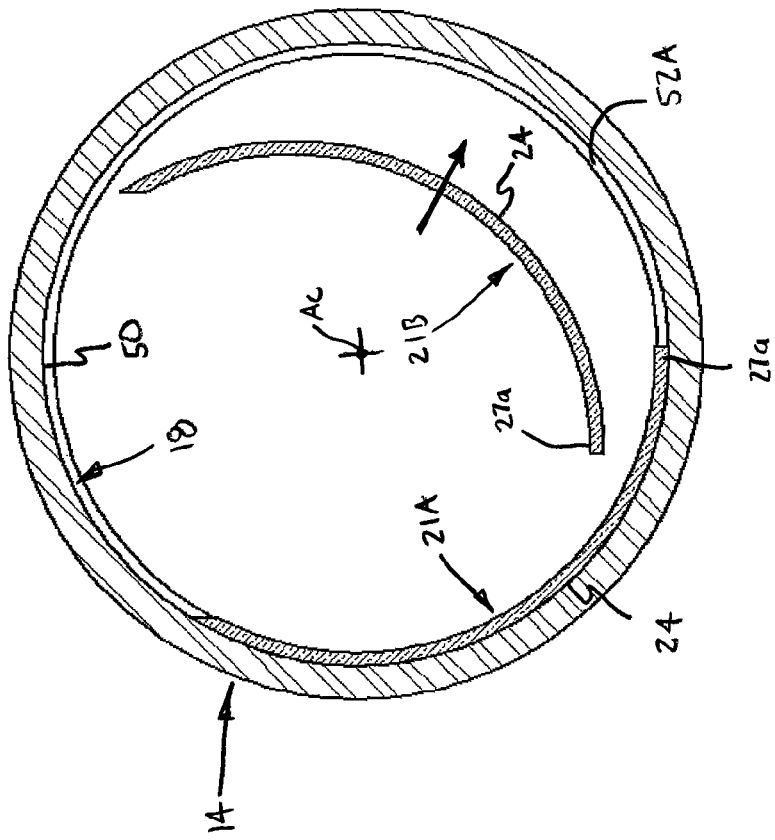
FIG. 14 is an axial cross-sectional view of the housing, the first tube segment and a second tube segment of the bushing, viewed in a downward direction and depicting a second step in the installation process.
Figure 17:
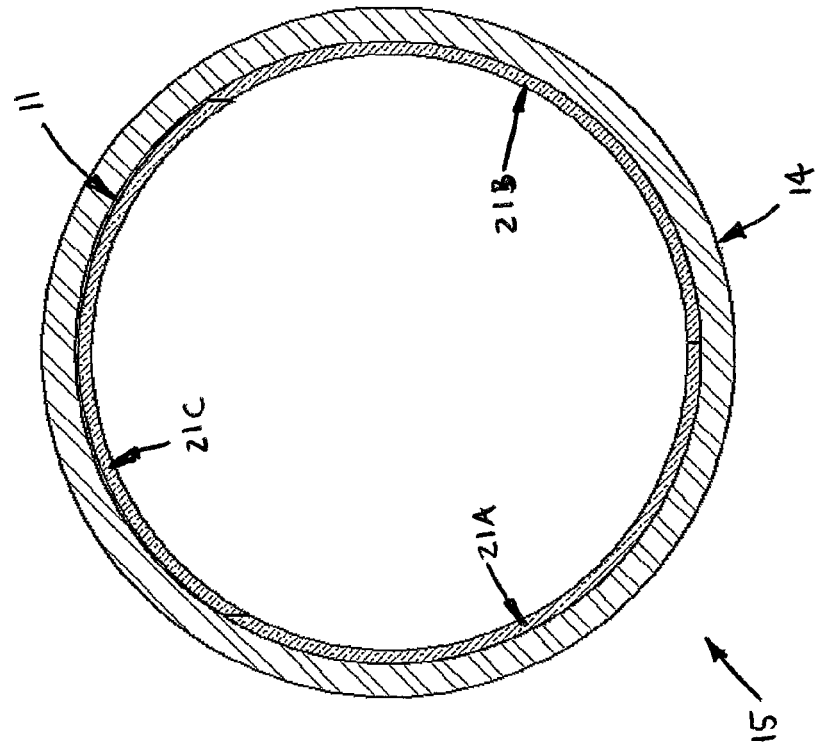
FIG. 17 is an axial cross-sectional view of the housing and the first, second and third tube segments, depicting the completion of the installation process.
Figure 16:
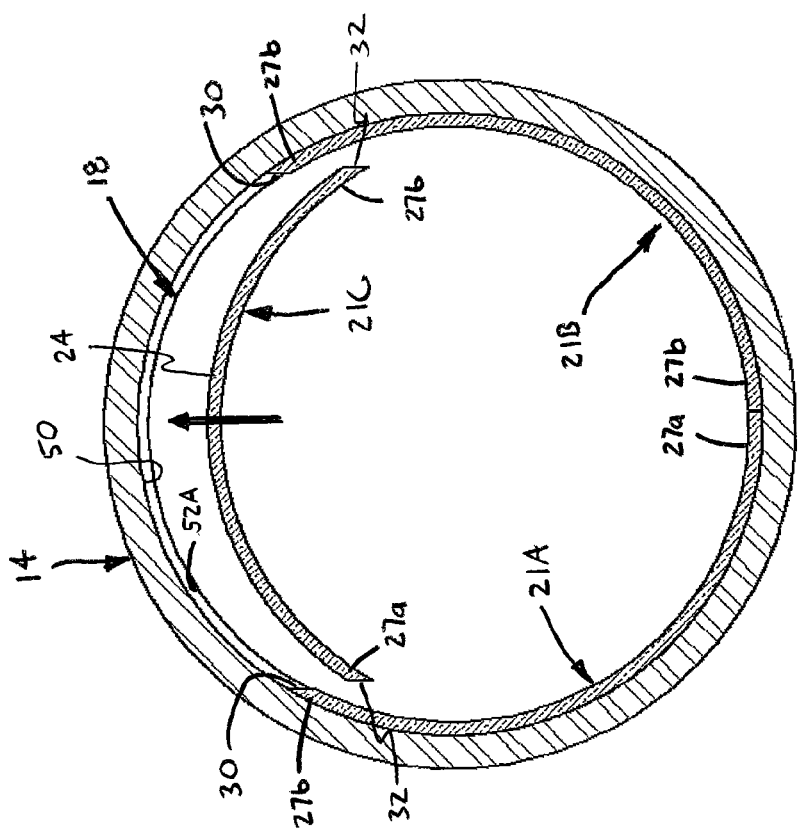
FIG. 16 is an axial cross-sectional view of the housing, the first and second tube segments and a third tube segment of the bushing, viewed in a downward direction and depicting the beginning of a third step in the installation process.

Referring now to FIGS. 12-19, in the preferred application described above with a substantially vertically-extending central axis $A_C$, the plurality of bushing tube segments 20 are installed within the groove 18 in the following manner. The first tube segment 21A is first inserted into the groove 18 and positioned such that one axial end 28 of the first segment 21A is disposed on the groove support surface 52A, and the segment outer surface 24 contacts the groove inner surface 50, as shown in FIGS. 12 and 13. Next, the second tube segment 21B is inserted into the groove 18 such that one axial end 28 is disposed on the groove support surface 52A, the segment outer surface 24 is disposed on the groove inner surface 50, and the first radial end 27a of the second segment 21B is adjacent to, and preferably abutting, the first radial end 27a of the first segment 21A, as depicted in FIGS. 14 and 15. If present, the projection(s) and recess(es) of the first and second tubular segments 21A, 21B are engaged to interlock. Then, as shown in FIGS. 16 and 17, the third tube segment 21C is inserted into the housing groove 18 such that one axial end 28 of the third segment 21C is disposed on the groove support surface 52A and each third segment angled end surface 32 is juxtaposed with a separate one of the angled end surfaces 30 of the first and second segments 21A, 21B.

More specifically, the third tube segment 21C is positioned generally between the first and second segments 21A, 21B and is then displaced generally radially outwardly, as indicated in FIG. 16. The two outwardly angled end surfaces 32 of the third segment 21C slide against the two inwardly-angled end surfaces 30 of the first and second segments 21A, 21B until the mating surfaces are juxtaposed and the third segment outer surface 24 is disposed against the groove inner surface 50, as shown in FIGS. 17 and 18. Thereafter, the cylindrical body 12 (shaft, piston, etc.) is displaced generally vertically along the axis $A_C$ to first enter one end of the housing bore 17 and then extend through the bushing bore 25, such that the cylindrical body 12 prevents radially-inward displacement of the tube segments 20 and thereby retains the segments 20 within the housing groove 18 and forms as shaft assembly 13, as shown in FIG. 19.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A bushing for supporting a movable cylindrical body within a housing, the housing having a central axis, an inner circumferential surface and an annular groove formed in the inner circumferential surface, the bushing comprising:

a plurality of generally arcuate tube segments disposeable within the groove and alignable circumferentially about the central axis so as to form a generally continuous tubular body configured to slidably support the cylindrical body, wherein the plurality of tube segments includes a first segment having an angled radial end that extends generally obliquely between two axial ends and faces generally toward the central axis, a second segment having an angled radial end that extends generally obliquely between two axial ends and faces generally toward the central axis, and a third segment having two angled radial ends that extend generally obliquely between two axial ends and face generally away from the central axis.

2. The bushing as recited in claim 1 wherein each tube segment is formed of a generally rigid metallic material.

3. The bushing as recited in claim 1 wherein each tube segment has an inner circumferential surface section and the inner circumferential surface sections of all of the plurality of tube segments form a generally continuous inner circumferential bearing surface configured to slidably support the cylindrical body when the plurality of segments are disposed within the housing groove.

4. The bushing as recited in claim 1 wherein each one of the tube segments has two opposing radial ends and two opposing axial ends, and each segment radial end being located generally adjacent to one of the radial ends of one of the other tube segments and each segment axial end being generally axially aligned with one of the two axial ends of each one of the other tube segments.

5. The bushing as recited in claim 4 wherein each one of the first and second segments having a first radial end adjacent to a first radial end of the other one of the first and second segments, and each one of the two angled radial ends of the third segment being generally juxtaposed with a separate one of the angled radial ends of the first and second segments.

6. The bushing as recited in claim 5 wherein a first of the two angled radial ends of the third segment being oriented so as to generally mate with the angled radial end of the first segment, and a second of the two angled radial ends of the third segment being oriented so as to generally mate with the angled radial end of the second segment.

7. The bushing as recited in claim 5 wherein the first radial end of one of the first and second segments has a projection and the first radial end of the other one of the first and second segments has a recess configured to receive the projection so as to interlock the first and second segments.

8. A support assembly for supporting a movable cylindrical body, the assembly comprising:

a housing having a central axis, an inner surface extending circumferentially about the axis and defining a bore for receiving at least a portion of the cylindrical body and an annular groove extending radially outwardly from the housing inner surface and circumferentially about the central axis; and a plurality of generally arcuate tube segments disposed within the annular groove and aligned circumferentially about the central axis so as to form a generally continuous tubular body configured to slidably support the cylindrical body, wherein the plurality of tube segments includes a first segment having an angled radial end that extends generally obliquely between two axial ends, a second segment having an angled radial end that extends generally obliquely between two axial ends, and a third segment having two angled radial ends that extend generally obliquely between two axial ends.

9. The support assembly as recited in claim 8 wherein each tube segment is formed of a generally rigid metallic material.

10. The support assembly as recited in claim 8 wherein each tube segment has an inner circumferential surface section, the inner circumferential surface sections of all of the plurality of tube segments forming a generally continuous bearing surface configured to slidably support the cylindrical body.

11. The support assembly as recited in claim 10 wherein the annular groove has an axial width and a radial depth and each of the plurality of tube segments has an axial width and a radial thickness, the axial width of each tube segment being lesser than the groove axial width such that all of the tube segments fit within the groove with clearance and the radial thickness of each tube segment is greater than the groove radial depth such that the bearing surface is spaced radially inwardly from the housing inner surface.

12. The support assembly as recited in claim 8 wherein each one of the tube segments has two opposing radial ends and two opposing axial ends, each segment radial end being located generally adjacent to one of the radial ends of one of the other tube segments and each segment axial end being generally axially aligned with one of the two axial ends of each one of the other tube segments.

13. The support assembly as recited in claim 12 wherein each one of the first and second segments having a first radial end adjacent to a first radial end of the other one of the first and second segments, the angled radial ends of the first and the seconds segments facing generally toward the central axis, and each one of the two angled radial ends of the third segment facing generally away from the central axis and being generally juxtaposed with a separate one of the angled radial ends of the first and second segments.

14. The support assembly as recited in claim 13 wherein one of the two angled ends of the third segment being oriented so as to generally mate with the angled radial end of the first segment and the other one of the two angled ends of the third segment being oriented so as to generally mate with the angled radial end of the second segment.

15. The support assembly as recited in claim 13 wherein:

the housing is oriented such that the central axis extends generally vertically;

the annular groove has an inner circumferential surface spaced radially outwardly from the housing inner surface and two facing shoulder surfaces spaced axially apart and extending radially and generally horizontally between the groove inner surface and the housing inner surface, one of the two shoulder surfaces facing generally upwardly and providing a support surface; and the plurality of segments are installed within the groove by inserting the first segment into the groove such that one axial end of the first segment is disposed on the groove support surface, inserting the second segment into the groove such that one axial end is disposed on the groove support surface and the second segment first radial end is adjacent to the first segment first radial end, and inserting the third segment into the groove such that one axial end of the third segment end is disposed on the groove support surface and each third segment angled radial end is juxtaposed with a separate one of the angled radial ends of the first and second segments.

16. The support assembly as recited in claim 13 wherein the first radial end of one of the first and second segments has a projection and the first radial end of the other one of the first and second segments has a recess configured to receive the projection so as to interlock the first and second segments.

17. A shaft assembly comprising:
a movable shaft;
a housing having a central axis, an inner surface extending circumferentially about the axis and defining a bore for receiving at least a portion of the shaft and an annular groove extending radially outwardly from the shaft and circumferentially about the axis; and
a plurality of generally arcuate tube segments disposed within the annular groove and aligned circumferentially about the axis so as to form a generally continuous tubular bushing configured to slidably support the shaft, each tube segment being formed of a generally rigid metallic material, wherein the plurality of tube segments includes
a first segment having an angled radial end that extends generally obliquely between two axial ends,
a second segment having an angled radial end that extends generally obliquely between two axial ends, and
a third segment having two angled radial ends that extend generally obliquely between two axial ends.

18. The shaft assembly as recited in claim 17 wherein each one of the tube segments has two opposing radial ends and two opposing axial ends, each segment radial end being located generally adjacent to one of the radial ends of one of the other tube segments and each segment axial end being generally axially aligned with one of the two axial ends of each one of the other tube segments.

19. The shaft assembly as recited in claim 18 wherein
each one of the first and second segments having a first radial end adjacent to a first radial end of the other one of the first and second segments,
the angled radial ends of the first and the seconds segments facing generally toward the central axis, and
each one of the two angled radial ends of the third segment facing generally away from the central axis and being generally juxtaposed with a separate one of the angled radial ends of the first and second segments.

20. The shaft assembly as recited in claim 19 wherein:
the housing is oriented such that the central axis extends generally vertically;
the annular groove has an inner circumferential surface spaced radially outwardly from the housing inner surface and two facing shoulder surfaces spaced axially apart and extending radially and generally horizontally between the groove inner surface and the housing inner surface, one of the two shoulder surfaces facing generally upwardly and providing a support surface;
the plurality of tube segments are installed within the groove by inserting the first segment into the groove such that one axial end of the first segment is disposed on the groove support surface, inserting the second segment into the groove such that one axial end is disposed on the groove support surface and the second segment first radial end is adjacent to the first segment first radial end, and inserting the third segment into the groove such that one axial end of the third segment end is disposed on the groove support surface and each third segment angled radial end is juxtaposed with a separate one of the angled radial ends of the first and second segments; and
the shaft is displaced generally vertically along the axis after the tube segments have been installed so as to be disposed within the bushing, thereby retaining the tube segments within the housing groove.

21. A method of supporting a cylindrical body within a housing, the method comprising the steps of:
forming an annular groove in an inner circumferential surface of the housing;
providing a plurality of generally arcuate tube segments, wherein the plurality of tube segments includes a first segment having an angled radial end that extends generally obliquely between two axial ends, a second segment having an angled radial end that extends generally obliquely between two axial ends, and a third segment having two angled radial ends that extend generally obliquely between two axial ends; and
installing the tube segments within the annular groove such that the tube segments are aligned circumferentially about the central axis so as to form a generally tubular body configured to slidably support the cylindrical body.

22. The method as recited in claim 21 wherein the step of providing a plurality of tube segments includes providing a generally circular tube and cutting the tube into the plurality of segments such that each one of the plurality of tube segments has two opposing radial ends and two opposing axial ends.

23. The method as recited in claim 22 wherein the housing groove has an inside diameter and the generally circular tube has an outside diameter approximately equal to the groove inside diameter.

24. The method as recited in claim 21 wherein the step of installing the plurality of tube segments includes arranging the segments such that each segment radial end is located generally adjacent to one of the radial ends of one of the other tube segments and each segment axial end is generally axially aligned with one of the two axial ends of each one of the other tube segments.

25. The method as recited in claim 24 wherein
each one of the first and second segments having a first radial end adjacent to a first radial end of the other one of the first and second segments,
the angled radial ends of the first and the seconds segments facing generally toward the central axis, and
each one of the two angled radial ends of the third segment facing generally away from the central axis and being generally juxtaposed with a separate one of the angled radial ends of the first and second segments.

26. The method as recited in claim 25 wherein:
the housing is oriented such that the central axis extends generally vertically;
the annular groove has an inner circumferential surface spaced radially outwardly from the housing inner surface and two facing shoulder surfaces spaced axially apart and extending radially and generally horizontally between the groove inner surface and the housing inner surface, one of the two shoulder surfaces facing generally upwardly and providing a support surface; and
the step of installing the tube segments includes inserting the first segment into the groove such that one axial end of the first segment is disposed on the groove support surface, inserting the second segment into the groove such that one axial end is disposed on the groove support surface and the second segment first radial end is adjacent to the first segment first radial end, and inserting the third segment into the groove such that one axial end of the third segment end is disposed on the groove support surface and each third segment angled radial end is juxtaposed with a separate one of the angled radial ends of the first and second segments.

* * * * *